United States Patent [19]
Hishon et al.

[11] Patent Number: 5,367,917
[45] Date of Patent: Nov. 29, 1994

[54] RETRACTOR

[75] Inventors: Michael K. Hishon, New Baltimore; Steven Stoll, Mt. Clemens, both of Mich.

[73] Assignee: TRW Vehicle Safety Systems Inc., Lyndhurst, Ohio

[21] Appl. No.: 963,727

[22] Filed: Oct. 20, 1992

[51] Int. Cl.⁵ .................. G05G 5/06; B60G 11/34; B65H 75/48
[52] U.S. Cl. ........................... 74/531; 267/25; 267/26; 267/273; 267/154; 74/567; 242/382.4; 242/384.6; 280/806; 280/807; 297/476; 297/480
[58] Field of Search .............. 267/25, 26, 27, 273, 267/279, 283, 154, 160; 74/531, 526, 523, 559, 567; 242/107.4 R, 107.4 A, 107.4 B; 280/806, 807; 297/476, 480

[56] References Cited

U.S. PATENT DOCUMENTS

| | | | |
|---|---|---|---|
| 4,436,255 | 3/1984 | Matsui et al. | 242/107.4 A |
| 4,518,132 | 5/1985 | Schmidt | 242/107.4 A |
| 4,550,932 | 11/1985 | Vilain et al. | 267/273 X |
| 4,555,075 | 11/1985 | Schmidt et al. | 242/107.4 A |
| 4,566,649 | 1/1986 | Petersen | 242/107.4 A |
| 4,583,701 | 4/1986 | Matsui et al. | 242/107.4 A |
| 4,597,546 | 7/1986 | Yamamoto et al. | 242/107.4 A |
| 4,726,539 | 2/1988 | Schmidt et al. | 242/107.4 A |
| 4,729,524 | 3/1988 | Befort et al. | 242/107.4 R |
| 4,744,588 | 5/1988 | Wharton | 267/273 X |
| 4,747,562 | 5/1988 | Tsukamoto et al. | 242/107.4 R |
| 4,749,143 | 6/1988 | Tsukamoto et al. | 242/107.4 A |
| 4,778,199 | 10/1988 | Haggerty et al. | 267/273 X |
| 4,811,912 | 3/1989 | Takada | 242/107.4 B |
| 5,007,660 | 4/1991 | Orndorff et al. | 267/25 X |
| 5,014,926 | 5/1991 | Rumpf et al. | 242/107.4 A |
| 5,020,783 | 6/1991 | Schroder et al. | 267/273 |
| 5,037,038 | 8/1991 | Zygutis et al. | 242/107.4 A |
| 5,119,999 | 6/1992 | Krambeck | 242/107.4 A |
| 5,199,323 | 4/1993 | Kaufman | 74/559 |

FOREIGN PATENT DOCUMENTS

| | | | |
|---|---|---|---|
| 1455115 | 11/1976 | United Kingdom | 267/273 |
| 2109083 | 5/1983 | United Kingdom | 267/273 |

Primary Examiner—Vinh T. Luong
Attorney, Agent, or Firm—Tarolli, Sundheim & Covell

[57] ABSTRACT

A vehicle seat belt retractor (10) includes a spindle (22), a ratchet wheel (30) and a locking pawl (44). The locking pawl (44) is movable between a disengaged position and an engaged position in which it blocks rotation of the ratchet wheel (30) and the spindle (22) in an unwinding direction. The locking pawl (44) is moved into its engaged position in response to a predetermined amount of rotation of the spindle (22) in the unwinding direction. The locking pawl (44) moves back to its disengaged position in response to rotation of the spindle (22) in an unwinding direction. The retractor (10) further includes a torsion spring (210) and a leaf spring (250) acting in series between the spindle (22) and the locking pawl (44).

21 Claims, 7 Drawing Sheets

RETRACTOR

FIELD OF THE INVENTION

The present invention relates to a vehicle seat belt retractor having a cinch mechanism, and particularly relates to a combined torsion and leaf spring usable in the retractor and elsewhere.

BACKGROUND OF THE INVENTION

A vehicle seat belt retractor includes a spindle upon which a seat belt is wound. A cinch mechanism responds to unwinding of a predetermined amount of the seat belt from the spindle by blocking further rotation of the spindle in the unwinding direction.

One such seat belt retractor including a cinch mechanism is disclosed in U.S. Pat. No. 4,726,539. The retractor disclosed in the '539 patent includes a ratchet wheel and a locking pawl. The ratchet wheel is connected to the spindle to rotate with the spindle. The locking pawl is movable into engagement with the ratchet wheel to block rotation of the ratchet wheel and the spindle in the unwinding direction.

The retractor disclosed in the '539 patent further includes a ring gear which is rotated during unwinding of the seat belt, a mode switching lever, and an overcenter spring. A pair of tabs are formed on the outside of the ring gear. Upon unwinding of a predetermined amount of the seat belt from the spindle, one of the tabs on the ring gear engages an arm on the mode switching lever to pivot the lever. The mode switching lever then causes the overcenter spring to move the locking pawl into engagement with the ratchet wheel. Upon winding of almost the entire length of the seat belt back onto the spindle, the other tab on the ring gear engages another arm on the mode switching lever. The mode switching lever again pivots and causes the overcenter spring to move the locking pawl back out of engagement with the ratchet wheel.

SUMMARY OF THE INVENTION

In accordance with the present invention, a vehicle seat belt retractor including a cinch mechanism comprises a rotatable spindle, a ratchet wheel and a locking pawl. The ratchet wheel is connected to the spindle to rotate with the spindle. The locking pawl is movable between a disengaged position and an engaged position. When the locking pawl is in its engaged position, it engages the ratchet wheel to block rotation of the ratchet wheel and the spindle in the unwinding direction.

The retractor further comprises an actuator means for moving the locking pawl into its engaged position in response to a predetermined amount of rotation of the spindle in the unwinding direction. The actuator means also enables the locking pawl to move back to its disengaged position in response to rotation of the spindle in the winding direction. Additionally, the actuator means includes spring means for transmitting forces from the spindle to the locking pawl. The spring means comprises a torsion spring and a leaf spring acting in series between the spindle and the locking pawl.

Further in accordance with the present invention, a spring member comprises a torsion spring, a supporting means, and a leaf spring. The torsion spring has a first axis, and is resiliently deflectable in torsion about the first axis. The supporting means supports the torsion spring to pivot about a second axis which is perpendicular to the first axis. The leaf spring is connected to the torsion spring at a location spaced from the second axis, and extends longitudinally from the torsion spring in a direction perpendicular to the first axis. The leaf spring is thus connected to the torsion spring to act in series with the torsion spring.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
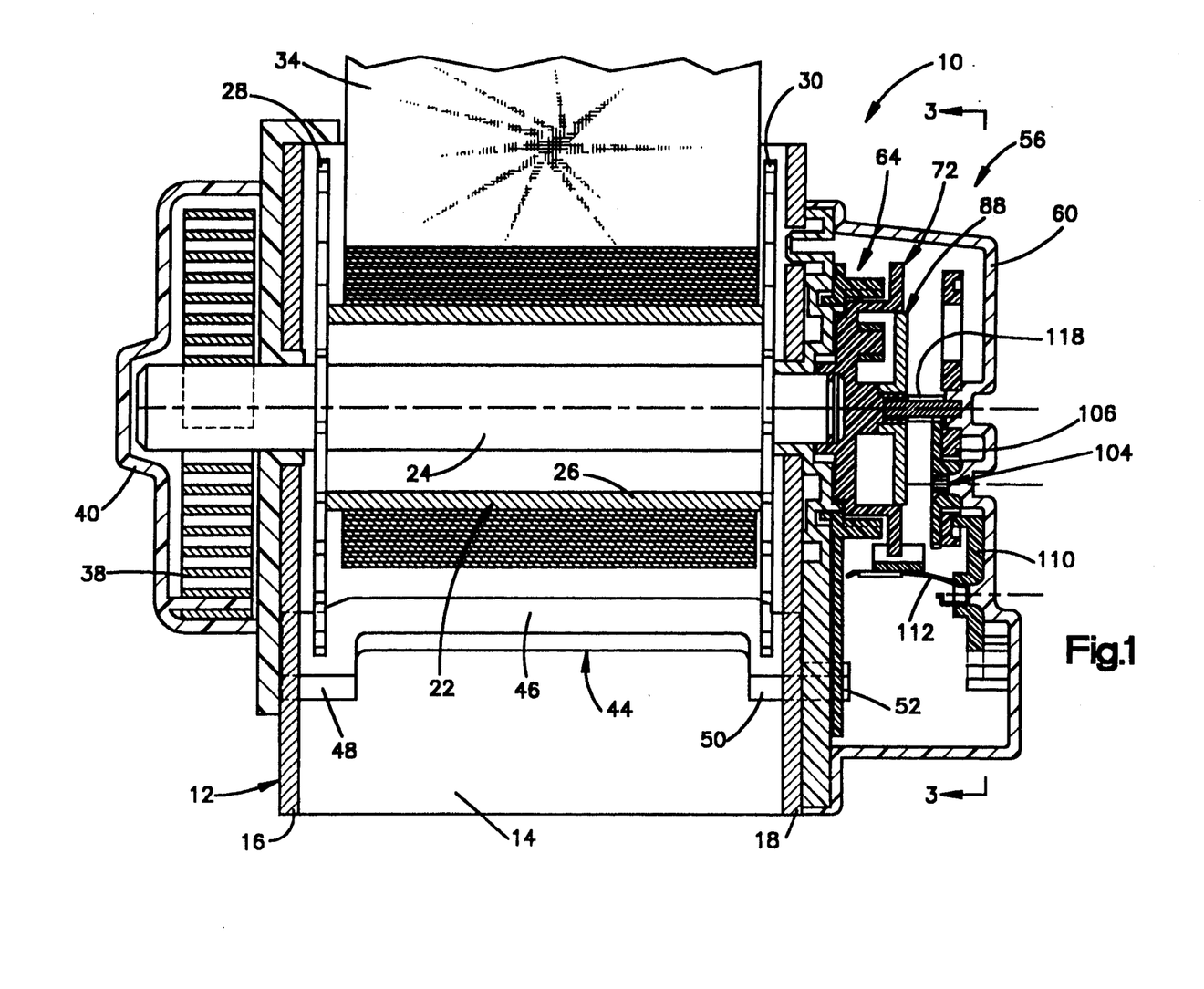
FIG. 1 is a sectional view of a seat belt retractor embodying the present invention with parts removed.

The present invention relates to a vehicle seat belt retractor. The seat belt retractor may be of many different constructions. As representative of the present invention, a vehicle seat belt retractor 10 is illustrated in FIG. 1.

The vehicle seat belt retractor 10 (FIG. 1) includes a metal frame 12 which is adapted to be fixed to a vehicle. The frame 12 includes a base 14 and sides 16 and 18. A spindle 22 is rotatably supported by the sides 16 and 18 of the frame 12.

The spindle 22 includes a central shaft 24 and a reel 26 which circumscribes the shaft 24. The reel 26 is connected to a pair of locking ratchet wheels 28 and 30. The locking ratchet wheels 28 and 30 are fixed to the shaft 24. A seat belt 34 is wound around the reel 26. The spindle 22 is rotatable in a belt extension or unwinding direction and in a belt retraction or winding direction.

A rewind spring 38 is connected to one end of the spindle shaft 24 and to a spring cover 40 secured to the side 16 of the frame 12. The rewind spring 38 acts between the spring cover 40 and the spindle shaft 24 to bias the spindle 22 to rotate in the belt retraction or winding direction.

A metal locking pawl or bar 44 has a central portion 46 which extends between a pair of locking portions 48 and 50. A locking bar projection or finger 52 extends from one end (the right end as viewed in FIG. 1) of the locking bar 44. The locking bar 44 is pivotally supported in openings (not shown) formed in the sides 16 and 18 of the frame 12. The locking portions 48 and 50 of the locking bar 44 are movable into engagement with the ratchet wheels 28 and 30 to block rotation of the spindle 22 in the unwinding direction.

Figure 2:
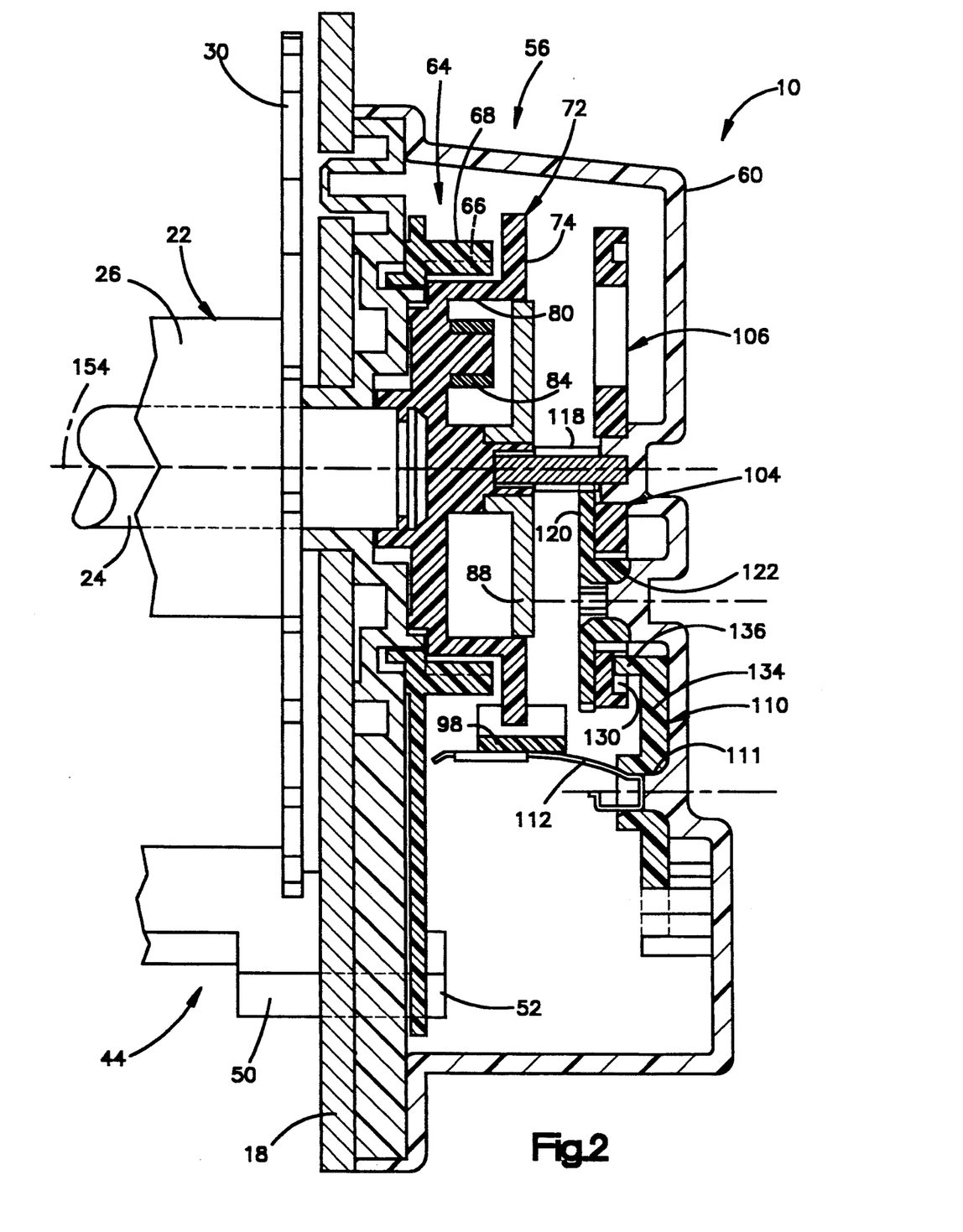
FIG. 2 is an enlarged view of a portion of the retractor of FIG. 1.

An actuator assembly 56 is connected with the side 18 of the frame 12 and is enclosed by a cover 60. The actuator assembly 56 includes a lock bar actuator 64 having a slot into which the locking bar finger 52 extends. The lock bar actuator 64 has a plurality of internal teeth 66 on the interior of a cylindrical outer wall 68 (FIG. 2). The lock bar actuator 64 is pivotable relative to the side 18 of the frame to move the locking portions 48 and 50 of the locking bar 44 into engagement with the ratchet wheels 28 and 30 (FIG. 1). A spring (not shown) biases the lock bar actuator 64 to a position in which the locking bar 44 is disengaged from the ratchet wheels 28 and 30.

An actuator ratchet 72 (FIG. 2) is disposed adjacent to the lock bar actuator 64. The actuator ratchet 72 has a radially extending disk portion 74. The actuator ratchet 72 is fixed to the spindle shaft 24 for rotation with the spindle shaft during winding or unwinding of the seat belt 34 onto or from the spindle 22. Thus, the actuator ratchet 72 rotates with the spindle 22 at the same speed as the spindle.

The actuator ratchet 72 has an annular array of ratchet teeth 76 (FIG. 3) which are formed on the radially outer periphery of the disk portion 74. A cylindrical wall 80 (FIG. 2) extends axially inwardly from the circular disk portion 74 of the actuator ratchet 72. The cylindrical wall 80 is formed with a plurality of openings (not shown) through which a control pawl, a portion of which is indicated at 84 (FIG. 2), is movable. The control pawl 84 is pivotally mounted on the actuator ratchet 72.

A flyweight 88, made of a relatively heavy material, is supported on the actuator ratchet 72 for rotation relative to the actuator ratchet. A pair of circumferentially spaced control pins (not shown) are positioned on the perimeter of the circular flyweight 88 and engage the control pawl 84.

The lock bar actuator 64 is pivoted to pivot the locking bar 44 into engagement with the locking ratchet wheels 28 and 30 in response to withdrawal of the belt 34 of the spindle 22 at a rate of acceleration above a predetermined rate. Withdrawal of the belt 34 from the spindle 22 at a rate above the predetermined rate causes rapid acceleration of the spindle and the actuator ratchet 72. The flyweight 88 also rotates, but lags behind rotation of the spindle 22 and actuator ratchet 72. The flyweight control pins retard rotation of the control pawl 84 to pivot the control pawl through an opening in the cylindrical side wall 80 of the actuator ratchet 72 into engagement with the internal teeth 66 on the outer wall 68 of the lock bar actuator 64. Thereafter, the control pawl 84 transmits rotational force from the spindle 22 to the lock bar actuator 64 to rotate the lock bar actuator and thereby cam the locking bar 44 into engagement with the ratchet wheels 28 and 30.

The actuator assembly 56 also includes a vehicle deceleration sensing inertia weight 92 (FIG. 3), which may be, for example, a steel ball. The inertia weight 92 rests in a cavity in a sensor housing 94. The sensor housing 94 is connected with the frame 12. A sensor lever 96 is pivotally mounted on the sensor housing 94 and rests upon the inertia weight 92. A portion of the sensor lever 96 extends upwardly into engagement with a generally L-shaped lock-up lever 98. The lock-up lever 98 is mounted on the lock bar actuator 64 (FIG. 2) and is pivotable into engagement with the ratchet teeth 76 (FIG. 3) formed on the outer perimeter of the actuator ratchet 72.

When the vehicle in which the retractor 10 is mounted is not decelerating at a rate above a predetermined rate, the inertia weight 92 rests at the bottom of the cavity in the sensor housing 94. When the inertia weight 92 is in this position, the lock-up lever 98 is spaced from the teeth 76 on the actuator ratchet 72. Upon deceleration of the vehicle at a rate above the predetermined rate, the inertia weight 92 moves relative to the sensor housing 94. Movement of the inertia weight 92 pivots the sensor lever 96 upward from the position shown in FIG. 3. This upward movement of the sensor lever 96 presses the lock-up lever 98 upward.

The lock-up lever 98 pivots upward and moves into engagement with the circular disk portion 74 of the actuator ratchet 72. Rotation of the spindle 22 and actuator ratchet 72 causes the next available tooth 76 to engage the lock-up lever 98. Thereafter, the lock-up lever 98 transmits rotational force from the actuator ratchet 72 to the lock bar actuator 64. This causes the lock bar actuator 64 to pivot and thereby cam the locking bar 44 into engagement with the ratchet wheels 28 and 30 to block rotation of the spindle 22 in the belt withdrawal direction.

The construction of the lock bar actuator 64, actuator ratchet 72, and flyweight 88 and the manner in which they cooperate with the lock-up lever 98 and inertia mass 92 is the same as is disclosed in U.S. Pat. No. 5,014,926 issued May 14, 1991 and entitled "Web Sensitive and Vehicle Sensitive Retractor". Therefore, the construction and mode of operation of the lock bar actuator 64, actuator ratchet 72, flyweight 88, and inertia mass 92 will not be further described herein.

In addition to being moved into engagement with the ratchet wheels 28 and 30 when the vehicle encounters sudden deceleration and when the belt 34 is withdrawn from the retractor 10 at an excessive rate, the locking bar 44 is moved into engagement with the ratchet wheels 28 and 30 in response to withdrawal of a predetermined amount of the belt 34 from the retractor. During withdrawal of the belt 34 from the retractor 10, a reduction gear assembly 104 (FIGS. 3 and 5) rotates a cam member 106 at a relatively slow speed about the central axis of the spindle 22. After a predetermined length of the belt 34 has been withdrawn from the retractor 10, the cam member 106 pivots an actuator lever 110 from an unactuated position shown in FIG. 3 to an actuated position shown in FIG. 4.

The actuator lever 110 is supported to rotate about a stub shaft portion 111 (FIG. 2) of the cover 60. As the actuator lever 110 moves to the actuated position, a leaf spring member 112 (FIGS. 4 and 5) lifts the lock-up lever 98 upwardly from a disengaged position shown in FIG. 3 to an engaged position shown in FIG. 4. When the lock-up lever 98 is in the engaged position, it engages a tooth 76 on the outer periphery of the actuator ratchet 72. The next increment of rotation of the spindle 22 and actuator ratchet 72 results in the transmission of force from the actuator ratchet 72 through the lock-up lever 98 to the lock bar actuator 64 upon which the lock-up lever 98 is pivotally mounted. This force causes the lock bar actuator 64 to pivot about the central axis of the spindle 22 and to move the locking bar 44 into engagement with the ratchet wheels 28 and 30 to block rotation of the spindle 22 in the belt unwinding direction.

Figure 3:
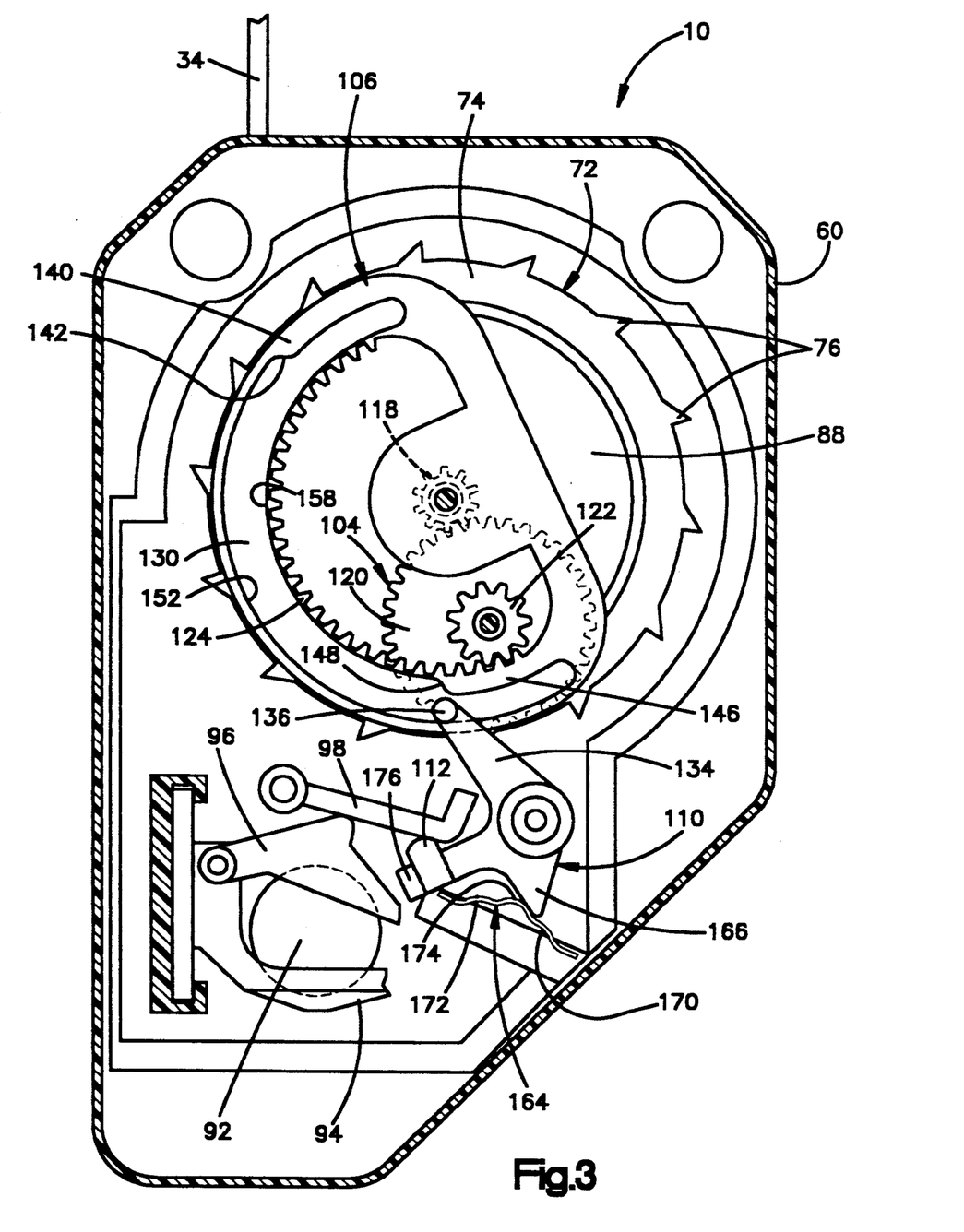
FIG. 3 is a schematic illustration taken approximately along line 3—3 of FIG. 1 showing parts of the retractor of FIG. 1 in one position.
Figure 4:
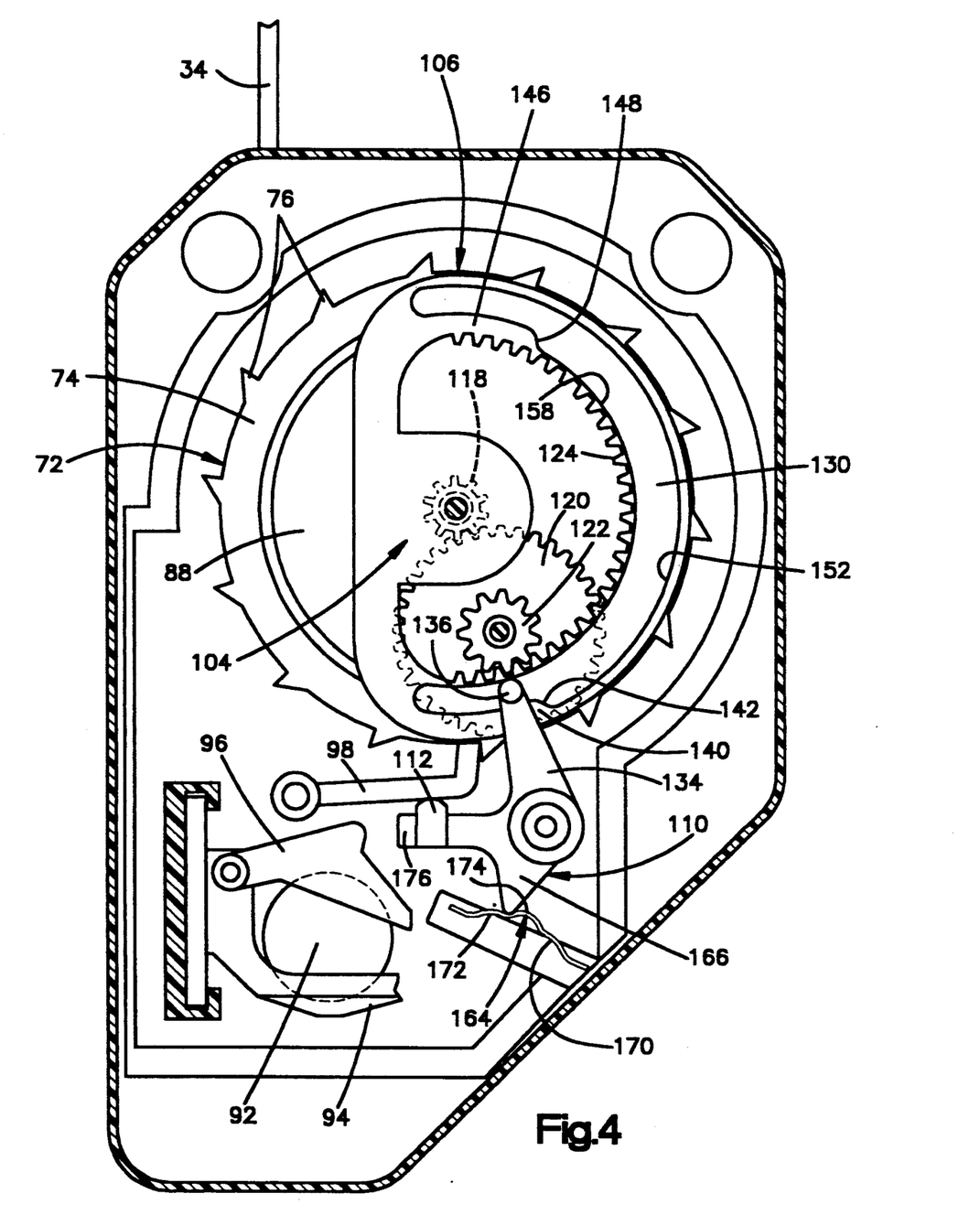
FIG. 4 is a schematic illustration, generally similar to FIG. 3, showing parts of the retractor in a different position.
Figure 5:
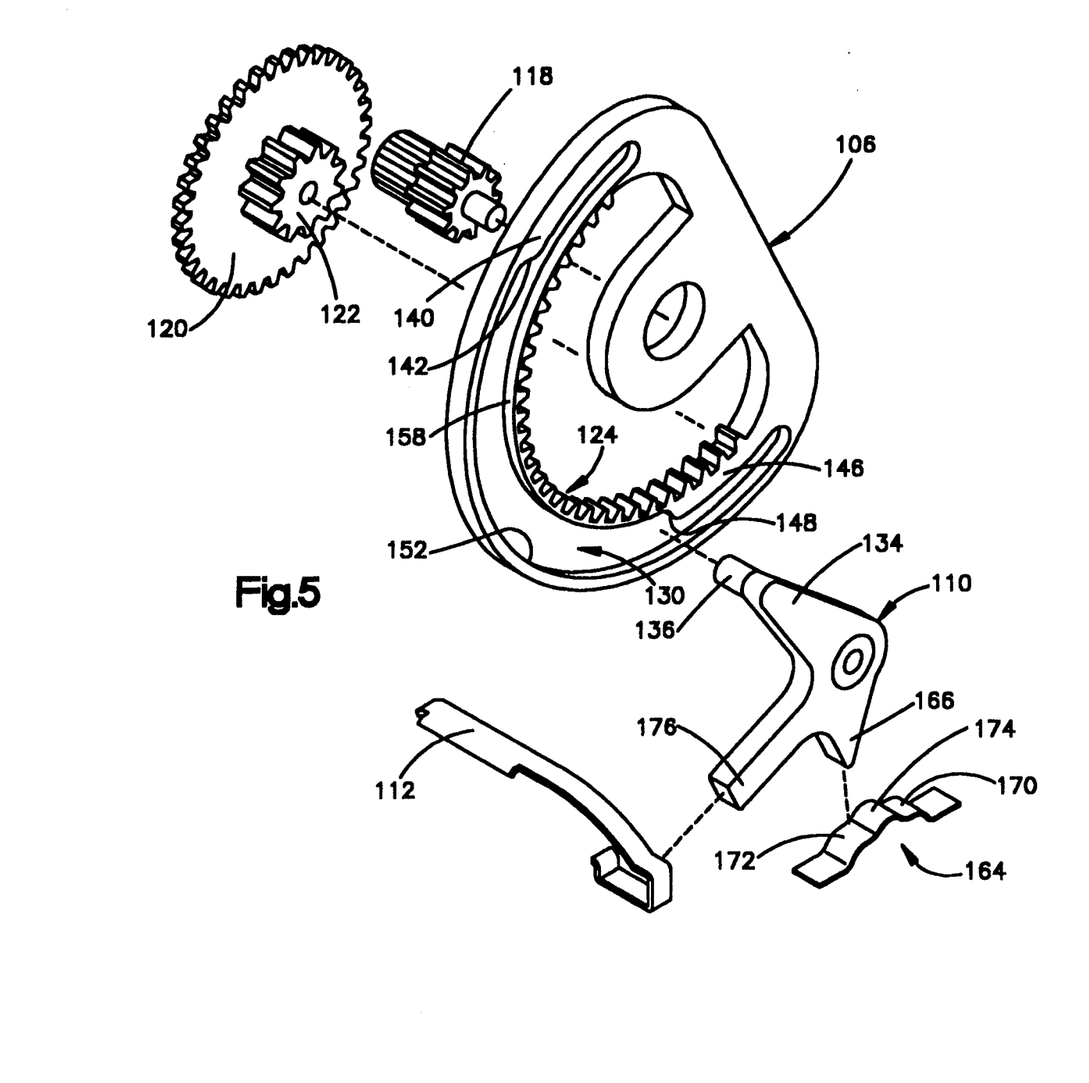
FIG. 5 is an exploded view illustrating the construction of certain parts of the retractor of FIG. 1.

During subsequent retraction of the belt 34 and rotation of the spindle 22 and actuator ratchet 72 in the belt winding direction, the actuator lever 110 maintains the lock-up lever 98 in the engaged position shown in FIG. 4. As the actuator ratchet 72 rotates in a counterclockwise (as viewed in FIG. 4) direction, the teeth on the actuator ratchet move past the end of the lock-up lever 98. After the belt 34 has been almost completely rewound onto the spindle 22, the cam member 106 pivots the actuator lever 110 from the actuated position of FIG. 4 back to the unactuated position of FIG. 3. This permits the lock-up lever 98 to fall out of engagement with the actuator ratchet 72. Thereafter, the belt 34 can again be unwound from the spindle 22.

The reduction gear assembly 104 includes a main drive pinion 118 (FIGS. 2, 3 and 5) having an end portion which is rotatably supported by the cover 60 (FIG. 2). The main drive pinion 118 is fixed to the actuator ratchet 72 for rotation with the actuator ratchet and spindle 22. The main drive pinion 118 is also disposed in meshing engagement with a large intermediate gear 120 (FIGS. 2 and 3) which is rotatably supported by the cover 60. The large intermediate gear 120 is formed in one piece with a small intermediate gear 122. The small intermediate gear 122 is disposed in meshing engagement with an arcuate gear segment 124 formed on the cam member 106. The cam member 106 is rotatably supported by the cover 60 for rotation about the central axis 154 of the spindle 22.

Upon rotation of the spindle 22 in the belt unwinding direction, the main drive pinion 118 rotates in a clockwise direction as viewed in FIG. 3. The clockwise rotation of the main drive pinion 118 results in the large and small intermediate gears 120 and 122 rotating in a counterclockwise direction (as viewed in FIG. 3). The counterclockwise rotation of the small intermediate gear 122 drives the arcuate gear segment 124 to rotate the cam member 106 in a counterclockwise direction from the position shown in FIG. 3 toward the position shown in FIG. 4 as the belt 34 is unwound from the spindle 22.

The reduction gear assembly 104 rotates the cam member 106 about the central axis 154 of the spindle 22 at a slower speed than and in a direction opposite to the direction of rotation of the spindle 22. During rotation of the spindle 22 through a substantial number of revolutions, sufficient to enable almost the entire length of the belt 34 to be unwound from the spindle 22, the reduction gear assembly 104 is effective to rotate the cam member 106 through less than half of a revolution.

Upon rewinding of the belt 34 onto the spindle 22, the reduction gear assembly 104 rotates the cam member 106 from the position shown in FIG. 4 back to the position shown in FIG. 3. Thus, as the belt 34 is wound back onto the spool 22, the main drive pinion 118 is rotated in a counterclockwise direction (as viewed in FIGS. 3 and 4). This effects rotation of the large and small intermediate gears 120 and 122 in a clockwise direction (as viewed in FIGS. 3 and 4). The clockwise rotation of the small intermediate gear 122 drives the arcuate gear segment 124 to rotate the cam member 106 in a clockwise direction about the central axis 154 of the spindle 22. When the belt 34 has been completely wound onto the spindle 22, the reduction gear assembly 104 will have rotated the cam member 106 back to the position shown in FIG. 3.

An arcuate cam track 130 on the cam member 106 cooperates with the actuator lever 110 to move the actuator lever 110 between the unactuated position shown in FIG. 3 and the actuated position shown in FIG. 4. The arcuate cam track 130 is disposed radially outward of the arcuate gear segment 124 and has the same radius of curvature as the arcuate gear segment. The actuator lever 110 has an actuator arm 134 with an axially projecting follower section 136 (FIG. 2). The follower section 136 of the actuator arm 134 is received in the cam track 130.

A first cam lobe 140 (FIG. 3) is located at one end of the cam track 130. The first cam lobe 140 has a cam surface 142 which engages the follower section 136 of the actuator lever 110 to pivot the actuator lever from the unactuated position shown in FIG. 3 to the actuated position shown in FIG. 4. This occurs after the belt 34 has been almost completely unwound from the spindle 22 and while the cam member 106 is being rotated in a counterclockwise direction (as viewed in FIGS. 3 and 4) by the reduction gear assembly 104.

Similarly, a second cam lobe 146 is located at the opposite end of the cam track 130. The second cam lobe 146 has a cam surface 148 which engages the follower section 136 of the actuator lever 110 to pivot the actuator lever from the actuated position shown in FIG. 4 to the unactuated position shown in FIG. 3. This occurs after the belt 34 has been almost completely wound onto the spindle 22 and while the cam member 106 is being rotated in a clockwise direction (as viewed in FIGS. 3 and 4).

The cam track 130 has an outer constant radius section 152. The outer constant radius section 152 of the cam track 130 has a center of curvature which is coincident with the axis 154 (FIG. 2) about which the spindle 22 and cam member 106 rotate. The constant radius section 152 of the cam track 130 is engaged by the follower section 136 of the actuator lever 110 as the belt 34 is unwound from the spindle 22.

When the follower section 136 of the actuator lever 110 is engaged by the cam surface 142 during unwinding of the belt 34 from the spindle 22, the actuator lever 110 is pivoted in a clockwise direction from the unactuated position shown in FIG. 3 to the actuated position shown in FIG. 4. As the actuator lever 110 is pivoted from the unactuated position to the actuated position, the follower section 136 of the actuator lever 110 moves out of engagement with the outer constant radius section 152 of the cam track 130 and into engagement with an inner constant radius section 158 of the cam track. As this occurs, the lock-up lever 98 is moved into engagement with the actuator ratchet 72. Continued rotation of the spindle 22 and actuator ratchet 72 in the belt unwinding direction pivots the lock bar actuator 64 about the spindle axis 154. This effects movement of the locking bar 44 into engagement with the ratchet wheels 28 and 30. The locking bar 44 then cooperates with the ratchet wheels 28 and 30 to block further rotation of the spindle 22 in the belt unwinding direction.

When the belt 34 is to be retracted, the wind-up spring 38 rotates the spindle 22 and winds the belt around the spindle. As the belt 34 is wound around the spindle 22, the reduction gear assembly 104 rotates the cam member 106 in a clockwise direction from the position shown in FIG. 4 toward the position shown in FIG. 3. As the cam member 106 is rotated toward the position shown in FIG. 3, the follower section 136 of the actuator lever 110 engages the inner constant radius section 158 of the cam track 130. The inner constant radius section 158 of the cam track 130 has a center of curvature which is located on the spindle axis 154.

The follower section 136 of the actuator lever 110 remains in engagement with the inner constant radius section 158 of the cam track 130 and spaced from the outer constant radius section 152 of the cam track until the follower section 136 engages the cam surface 148 on the cam lobe 146. When the follower section 136 engages the cam surface 148 on the cam lobe 146, the cam surface 148 pivots the actuator lever 110 in a counterclockwise direction from the position shown in FIG. 4 to the position shown in FIG. 3. As this occurs, the follower section 136 of the actuator lever 110 moves out of engagement with the inner constant radius section 158 of the cam track 130 and into engagement with the outer constant radius section 152 of the cam track. The leaf spring 112 moves downward with the actuator lever 110 and permits the lock-up lever 98 to drop downward out of engagement with the actuator ratchet 72. Therefore, as the next increment of the belt 34 is wound onto the spindle 22, the locking bar 44 is spring biased downward out of engagement with the ratchet wheels 28 and 30.

A detent spring 164 cooperates with a detent arm 166 on the actuator lever 110 to maintain the actuator lever 110 in the unactuated position shown in FIG. 3 during movement of the follower portion 136 of the actuator lever along the outer constant radius section 152 of the cam track 130. In addition, the detent spring 164 cooperates with the detent arm 166 to maintain the actuator lever 110 in the actuated position shown in FIG. 4 during movement of the follower portion 136 of the actuator lever along the inner constant radius section 158 of the cam track 130. The detent spring 164 has a first portion 170 which engages the detent arm 166 when the actuator lever 110 is in the unactuated position of FIG. 3. The detent spring 164 has a second portion 172 which engages the detent arm 166 when the actuator lever 110 is in the engaged position of FIG. 4. The detent spring has a third portion 174 (FIG. 5) which is intermediate portions 170, 172 and which projects above portions 170, 172. The portion 174 is depressed by the actuator lever 110 to allow the actuator lever 110 to move between portions 170, 172.

The leaf spring 112 (FIGS. 2 and 5) transmits force from the actuator lever 110 to the lock-up lever 98 to move the lock-up lever 98 from the disengaged position of FIG. 3 to the engaged position of FIG. 4. One end of the leaf spring 112 is wrapped around an actuator arm 176 of the actuator lever 110. The opposite end of the leaf spring extends beneath the lock-up lever 98. Upon movement of the actuator lever 110 from the unactuated position part way toward the actuated position of FIG. 4, the leaf spring 112 moves the lock-up lever 98 upwardly into engagement with the actuator ratchet 72. Continued movement of the actuator lever 110 toward the actuated position results in the leaf spring 112 being resiliently deflected and the lock-up lever being pressed against the actuator ratchet 72 by the leaf spring 112.

The cam member 106, main drive pinion 118, intermediate gears 120, 122 and the actuator lever 110 are all rotatably mounted on the cover 160. This facilitates positioning of the cam men%her 106, main drive pinion 118, intermediate gear 104 and actuator lever 110 relative to the actuator ratchet 72 and lock bar actuator 64 during assembly of the retractor 110.

Figure 6:
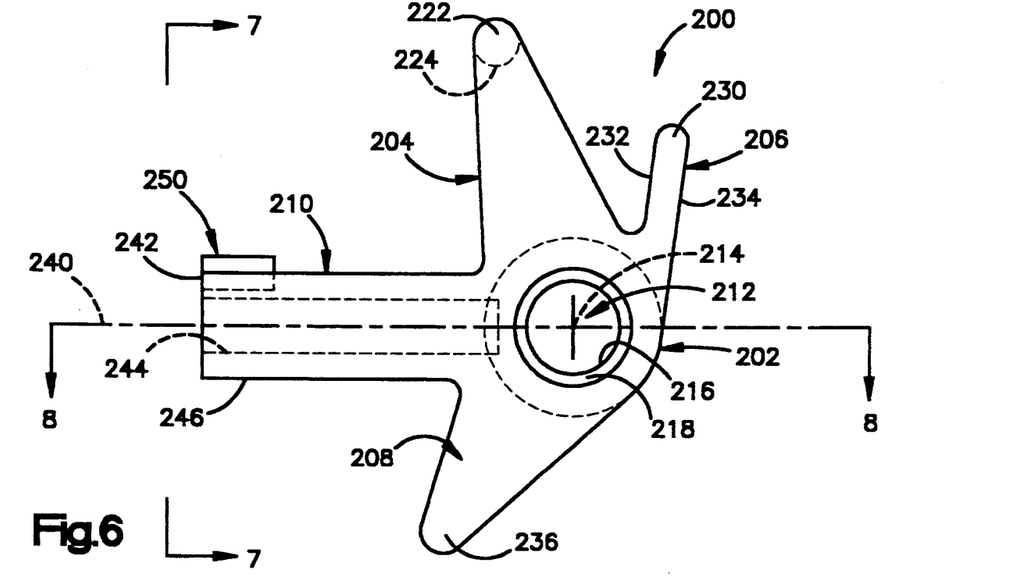
FIG. 6 is a side view of an alternative part of the retractor of FIG. 1.
Figure 7:
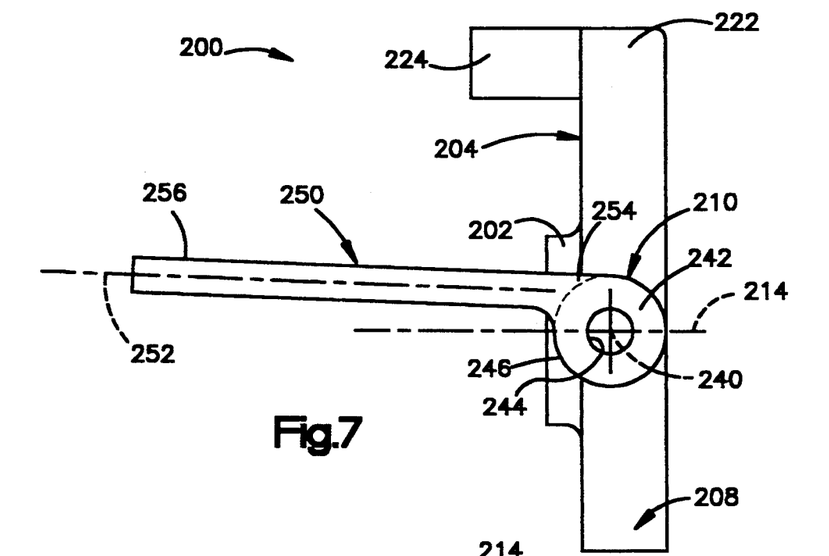
FIG. 7 is a view taken on line 7—7 of FIG. 6.
Figure 8:
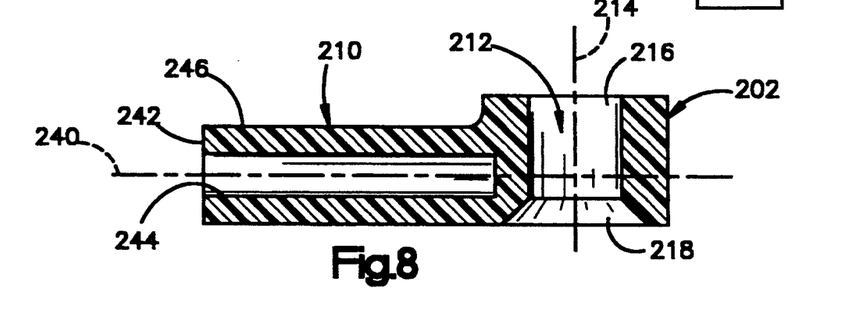
FIG. 8 is a view taken on line 8—8 of FIG. 6.

As thus far described, the seat belt retractor 10 is disclosed in co-pending U.S. patent application Ser. No. 731,521, filed Jul. 17, 1991, now U.S. Pat. No. 5,257,754 issued on Nov. 2, 1993 entitled "Retractor." differently constructed actuator lever 200 for the retractor 10 is shown in FIGS. 6–8. The actuator lever 200 is used in the retractor 10 in place of the actuator lever 110 which is described above.

The actuator lever 200 includes a hub 202 and a plurality of arms 204–210 extending radially from the hub 202. The hub 202 has a passage 212 extending through the hub 202 along an axis 214. The passage 212 is defined in part by a cylindrical inner bearing surface 216 and in part by a frustoconical inner bearing surface 218, both of which are centered on the axis 214.

The first radial arm 204 of the actuator lever 200 has a generally triangular shape with a rounded outer end portion 222. A cylindrical cam follower 224 is connected to the outer end portion 222. The cam follower 224 projects from one side of the first radial arm 204 in a direction parallel to the axis 214.

The second radial arm 206 projecting from the hub 202 has a rounded outer end portion 230, a first side surface 232 facing the first radial arm 204, and a second side surface 234 facing oppositely to the first side surface 232. The third radial arm 208 projecting from the hub 202 is generally similar to the first radial arm 204, and has a rounded outer end portion 236.

The fourth radial arm 210 projecting from the hub 202 of the lever 200 has a longitudinal central axis 240 and an outer end 242. The longitudinal central axis 240 of the arm 210 intersects, and is perpendicular to, the axis 214 of the hub 202. The arm 210 has a circular cross-sectional shape. In the preferred embodiment, the arm 210 is tubular with cylindrical inner and outer surfaces 244 and 246 which are both centered on the axis 240. The fourth radial arm 210 is thus deigned as a torsion spring which is resiliently deflectable in torsion about the axis 240 between its outer end 242 and the hub 202.

As shown in FIGS. 6 and 7, the lever 200 also includes a leaf spring 250. The leaf spring 250 has a longitudinal central axis 252, an inner end portion 254, and an outer end portion 256. The inner end portion 254 of the leaf spring 250 is connected to the arm 210 adjacent to the outer end 242 of the arm 210. The leaf spring 250 extends tangentially from the arm 210. The leaf spring 250 thus has an unflexed condition, as shown in FIG. 7, in which its longitudinal central axis 252 extends in a direction perpendicular to the longitudinal central axis 240 of the arm 210.

The actuator lever 200 is preferably formed as a unitary body of plastic material. Most preferably, the lever 200 is formed of nylon 6/6 including 40% by weight of reinforcing glass fibers.

The lever 200 is mounted in the retractor 10 in the same manner as described above concerning the lever 110. The stub shaft 111 on the cover 60 (FIG. 2) extends into the passage 212 in the hub 202, and thus supports the lever 200 for rotation about the axis 114 of the hub 202. The stub shaft 111 shown in FIG. 2 would be modified to match the shapes of the bearing surfaces 216 and 218 in the hub 202. The cam follower 224 on the first radial arm 204 extends into the cam track 130 in the cam member 106. The third radial arm 208 is engaged with the detent spring 164. Additionally, the leaf spring 250 on the lever 200 extends from the fourth radial arm 210 to the lock-up lever 98. The lock-up lever 98 rests on the outer end portion 256 of the leaf spring 250 just as it rests on the leaf spring member 112 shown in FIG. 2.

When the lever 200 is mounted in the retractor 10 as described above, it is rotatable about the axis 214 of the hub 202 under the influence of the cam member 106. Like the lever 110, the lever 200 is rotatable by the cam member 106 between an unactuated position and an actuated position. When the lever 200 rotates toward its actuated position, the fourth radial arm 210 pivots about the axis 214 in a clockwise direction as viewed in FIG. 6. The arm 210 then lifts the leaf spring 250 at the inner end portion 254 of the leaf spring 250. When the inner end portion 254 of the leaf spring 250 is lifted by the pivoting arm 210, the outer end portion 256 of the leaf spring 250 lifts the lock-up lever 98 from its disengaged position (FIG. 3) toward its engaged position (FIG. 4).

The cam member 106 may continue to urge the lever 200 to rotate about the axis 214 after the lock-up lever 98 has been moved into its engaged position. Forces which are then exerted against the lever 200 by the cam member 206 are transmitted to the lock-up lever 98 through the arm 210 and the leaf spring 250, and are resisted by the lock-up lever 98. The leaf spring 250 and the arm 210 then flex in series between the lock-up lever 98 and the hub 202 so that the lever 200 will not break between the lock-up lever 98 and the hub 202. The lever 200 therefore has a long useful life.

More specifically, the engaged lock-up lever 98 applies a resisting force against the outer end portion 256 of the leaf spring 250 as the inner end portion 254 moves upward with the arm 210. The leaf spring 250 responds by bending between its opposite end portions 254 and 256. The leaf spring 250 further applies a twisting force to the arm 210 where the inner end portion 254 of the leaf spring 250 is connected to the arm 210. The arm 210 responds by twisting about its longitudinal axis 240 between its outer end 242 and the hub 202.

When the cam member 106 rotates the actuator lever 200 back from its actuated position toward its unactuated position, the arm 210 pivots back about the axis 214 and carries the inner end portion 254 of the leaf spring 250 downward. The outer end portion 256 of the leaf spring 250 follows the inner end portion 254 downward. The actuator lever 200 thus enables the lock-up lever 98 to move downward from its engaged position toward its disengaged position. The arm 210 and the leaf spring 250 move resiliently in series back toward their unflexed conditions during such rotation of the actuator lever 200.

The third radial arm 208 of the actuator lever 200 cooperates with the detent spring 164 in the same manner as described above concerning the detent arm 166 on the actuator lever 110. As a further feature of the actuator lever 200, the second radial arm 206 limits pivotal movement of the lever 200 in a clockwise direction, as viewed in FIG. 6, when the second side surface 234 of the arm 206 moves against an appropriate abutment surface (not shown) on the cover 60.

Figures 9, 9A, 10:
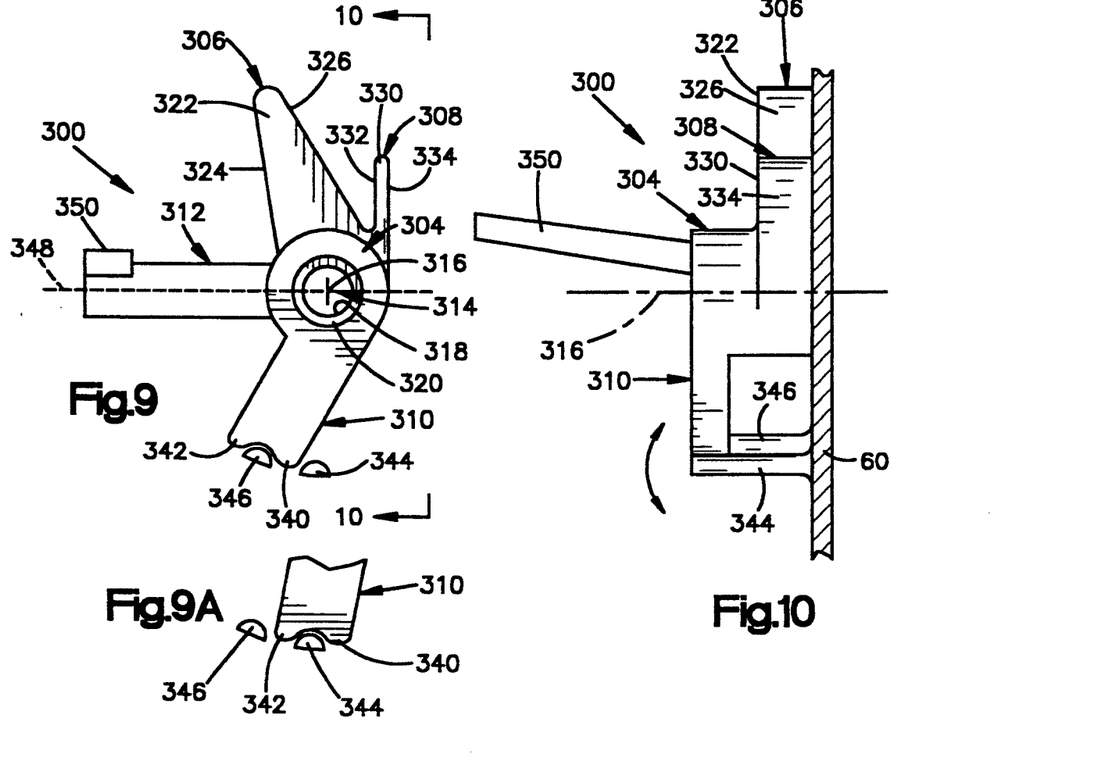
FIG. 9 is a side view of other alternative parts of the retractor of FIG. 1.
FIG. 9A is a partial view of the apparatus of FIG. 9 with a part shown in a different position.
FIG. 10 is a view taken on line 10—10 of FIG. 9.
Figures 11, 12:
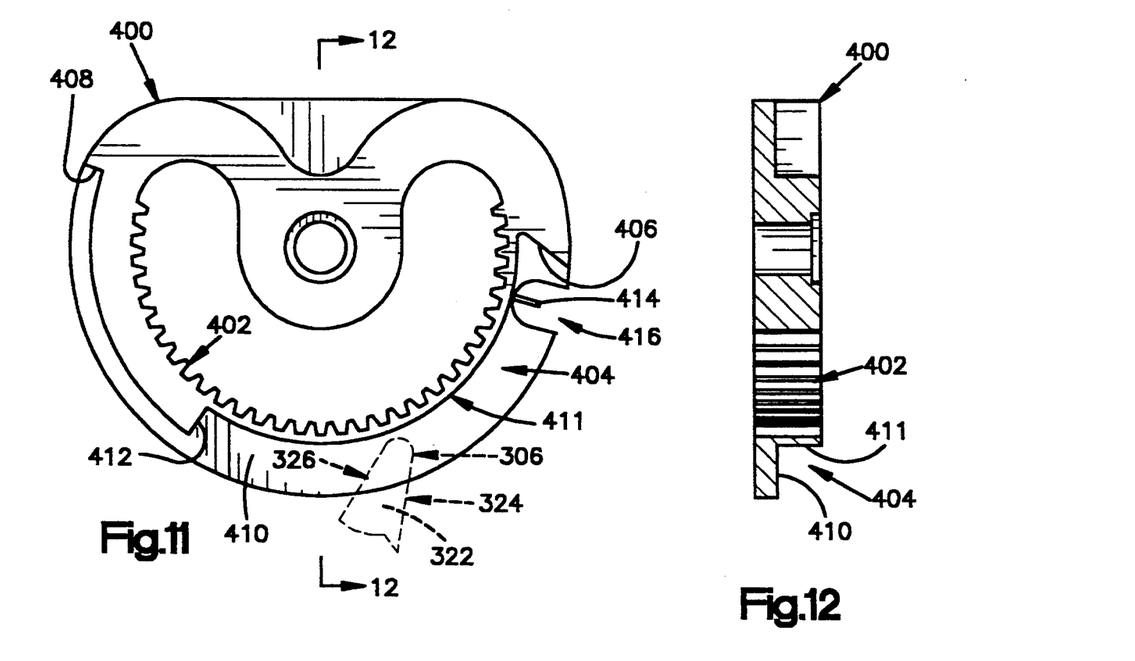
FIG. 11 is a side view of another alternative part of the apparatus of FIG. 1.
FIG. 12 is a view taken on line 12—12 of FIG. 11.

Another differently constructed actuator lever 300 for the retractor 10 is shown in FIGS. 9, 9A and 10. The actuator lever 300 is used in the retractor 10 with a gear member 400 which is shown in FIGS. 11 and 12. The gear member 400 is a substitute for the cam member 106 described above.

The actuator lever 300 is similar to the actuator lever 200 which is described above with reference to FIGS. 6–8. The actuator lever 300 thus has a hub 304 and a plurality of arms 306–312 extending radially from the hub 304. The hub 304 has a passage 314 extending through the hub 304 along an axis 316. The passage 314 is defined in part by a cylindrical inner bearing surface 318 and in part by a frustoconical inner bearing surface 320, both of which are centered on the axis 316. The hub 304 is thus constructed to support the actuator lever 300 to rotate about the axis 316 when the actuator lever 300 is mounted in the cover 60.

The first radial arm 306 of the actuator lever 300 has a generally triangular shape with a rounded outer end portion 322. The rounded outer end potion 322 has first and second side surfaces 324 and 326. Unlike the actuator lever 200, the actuator lever 300 does not have a cam follower projecting from one side of its first radial arm 306.

The second radial arm 308 of the actuator lever 300 has a rounded outer end portion 330, and has opposite side surfaces 332 and 334. Like the second radial arm 206 of the actuator lever 200, the second radial arm 308 of the actuator lever 300 limits movement of the actuator lever 300 in the cover 60.

The third radial arm 310 of the actuator lever 300 has first and second knobs 340 and 342 at its outer end. The knobs 340 and 342 are associated with first and second detent posts 344 and 346. As shown in FIG. 10, the detent posts 344 and 346 are cantilevered members which project inwardly from the cover 60 in which the actuator lever 300 is mounted. Both of the detent posts 344 and 346 are resiliently bendable so that their free outer end portions can move vertically relative to the cover 60, as indicated by the arrow shown in FIG. 10.

The actuator lever 300 has an actuated position, as shown in FIG. 9. When the actuator lever 300 is in the actuated position, the first knob 340 on the third radial arm 310 is captured between the two detent posts 344 and 346. The detent posts 344 and 346 thus hold the actuator lever 300 releasably in the actuated position.

The actuator lever 300 is rotatable about the axis 316 from the actuated position to an unactuated position, which is illustrated in FIG. 9A. When the actuator lever 300 moves toward the unactuated position, the detent posts 344 and 346 bend vertically downward as the knobs 340 and 342 move over the detent posts 344 and 346 to the right as viewed in FIG. 9. The detent posts 344 and 346 subsequently spring back to their original positions when the third radial arm 310 reaches the position shown in FIG. 9A. The second knob 342 is then captured between the detent posts 344 and 346, and the actuator lever 300 is thus held releasably in the unactuated position. The detent posts 344 and 346 again bend vertically downward, and then spring back upward, upon movement of the third radial arm 310 back to the actuated position shown in FIG. 9.

The two detent posts 344 and 346 provide redundancy to ensure that the actuator lever 300 is secured in either the actuated or the unactuated position even if one of the two detent posts 344 and 346 breaks. Additionally, both of the detent posts 344 and 346 must be deflected by the actuator lever 300 upon movement of the actuator lever 300 between its two positions. Therefore, each of the detent posts 344 and 346 needs to provide only half of the total spring force which resists movement of the actuator lever 300. Each of the detent posts 344 and 346 is thus smaller than a single member which would provide the spring force of both detent posts 344 and 346. The relatively small size of the detent posts 344 and 346 allows lower deflection strains and therefore higher fatigue endurance limits.

In addition to the first three radial arms 306, 308 and 310, the actuator lever 300 also has a fourth radial arm 312. Like the fourth radial arm 210 of the actuator lever 200 described above, the fourth radial arm 312 of the actuator lever 300 is designed as a torsion spring which is resiliently deflectable in torsion about its longitudinal central axis 348. The fourth radial arm 312 also supports a leaf spring 350 which is constructed like the leaf spring 250 described above.

As shown in FIGS. 11 and 12, the gear member 400 has an arcuate gear segment 402. The arcuate gear segment 402 is constructed like the arcuate gear segment 124 of the cam member 106 described above. The gear member 400 is thus constructed to rotate in the retractor 10 in the same manner as the cam member 106 in response to rotation of the spindle 22 in the winding and unwinding directions.

The gear member 400 also has an arcuate track 404 which extends circumferentially about the gear member 400. The track 404 has a first end surface 406 and a second end surface 408. The track 404 also has a first side surface 410 and a second side surface 411 which is perpendicular to the first side surface 410. The first and second side surfaces 410 and 411 extend circumferentially along the length of the track 404 between the two end surfaces 406 and 408. The second side surface 411 has an abutment surface portion 412 located between the two end surfaces 406 and 408.

The gear member 400 includes a flexible retainer post 414. The retainer post 414 projects radially outward from the second side surface 411 of the track 404 at a location near the first end surface 406 of the track 404. The retainer post 414 is centered with respect to a slot 416. The slot 416 extends from the first side surface 410 axially through the gear member 400, and provides tool clearance for manufacturing the retainer post 414.

The rounded outer end portion 322 of the first radial arm 306 on the actuator lever 300 fits in the track 404 in the gear member 400 adjacent to the first side surface 410, as indicated by dashed lines in FIG. 11. The rounded outer end portion 322 of the first radial arm 306 is initially received in the track 404 between the retainer post 414 and the first end surface 406 when the retractor 10 is being assembled. The retainer post 414 then holds the first radial arm 306 in a predetermined position during assembly of the retractor 10. The retainer post 414 is thin and flexible enough to permit the rounded outer end portion 322 of the first radial arm 306 to move back and forth along the track 404 past the retainer post 414 when the gear member 400 rotates in the retractor 10.

When the seat belt is unwound from the spindle 22 in the retractor 10, the gear member 400 is rotated in a clockwise direction as viewed in FIG. 11. When a predetermined amount of the seat belt is unwound from the spindle 22, the first end surface 406 of the track 404 moves against the first side surface 324 of the first radial arm 306 to rotate the actuator lever 300 into the actuated position. When the seat belt is subsequently wound back onto the spindle 22, the gear member 400 is rotated in a counterclockwise direction as viewed in FIG. 11. When a predetermined amount of the seat belt is wound back onto the spindle 22, the abutment surface portion 412 of the second side surface 411 of the track 404 moves against the second side surface 326 of the first radial arm 306. The abutment surface portion 412 thus rotates the actuator lever 300 back into the unactuated position.

From the above description of the invention, those skilled in the art will perceive improvements, changes and modifications. Such improvements, changes and modifications within the skill of the art are intended to by the appended claims.

Having described the invention, the following is claimed:

1. Apparatus comprising:
a torsion spring having a longitudinal central axis, said torsion spring being resiliently deflectable in torsion about said longitudinal central axis;
means for supporting said torsion spring to pivot about a hub axis which is perpendicular to said longitudinal central axis of said torsion spring; and
a leaf spring connected to said torsion spring at a location spaced from said hub axis, said leaf spring extending longitudinally from said torsion spring in a direction perpendicular to said longitudinal central axis of said torsion spring, whereby said leaf spring acts in series with said torsion spring;
said torsion spring having a circular cross-sectional shape centered on said longitudinal central axis and comprising an elongate tube extending longitudinally along said longitudinal central axis;
said leaf spring extending tangentially from said tube;
said means for supporting said torsion spring including a hub having a cylindrical bearing surface centered on said hub axis;
said torsion spring, said leaf spring and said hub being portions of a unitary body formed of a single material which is a composite of plastic reinforced with glass fibers.

2. Apparatus comprising:
a torsion spring having a longitudinal central axis, said torsion spring being resiliently deflectable in torsion about said longitudinal central axis;
means for supporting said torsion spring to pivot about a hub axis which is perpendicular to said longitudinal central axis of said torsion spring; and
a leaf spring connected to said torsion spring at a location spaced from said hub axis, said leaf spring extending longitudinally from said torsion spring in a direction perpendicular to said longitudinal central axis of said torsion spring, whereby said leaf spring acts in series with said torsion spring;
said torsion spring having a circular cross-sectional shape centered on said longitudinal central axis and comprising an elongate tube extending longitudinally along said longitudinal central axis;
said leaf spring extending tangentially from said tube;
said means for supporting said torsion spring including a hub having a cylindrical bearing surface centered on said hub axis;
said apparatus further comprising an actuator arm and a cam follower, said actuator arm extending radially from said hub, said actuator arm and said torsion spring being fixed to said hub to pivot together about said hub axis, said cam follower extending from said actuator arm in a direction parallel to said hub axis.

3. Apparatus comprising:
a torsion spring having a longitudinal central axis, said torsion spring being resiliently deflectable in torsion about said longitudinal central axis;
a leaf spring having opposite longitudinal end portions, said leaf spring being resiliently bendable between said opposite longitudinal end portions;

means for connecting said leaf spring to said torsion spring for said leaf spring to act in series with said torsion spring; and means for supporting said torsion spring and said leaf spring to rotate together about a hub axis which is perpendicular to said longitudinal central axis of said torsion spring.

4. Apparatus as defined in claim 3 wherein said supporting means defines a hub having a cylindrical bearing surface centered on said hub axis, said torsion spring having an inner end fixed to said hub and an outer end spaced from said hub along said longitudinal central axis of said torsion spring, said torsion spring being resiliently deflectable in torsion upon twisting of said outer end relative to said inner end and said hub.

5. Apparatus as defined in claim 4 wherein said leaf spring is connected to said torsion spring so as to twist said outer end of said torsion spring relative to said inner end and said hub when said leaf spring acts in series with said torsion spring.

6. Apparatus as defined in claim 5 wherein said leaf spring extends longitudinally from said torsion spring in a direction perpendicular to said longitudinal central axis of said torsion spring.

7. Apparatus as defined in claim 6 wherein one of said end portions of said leaf spring is connected to said torsion spring adjacent to said outer end of said torsion spring, both of said end portions of said leaf spring being spaced from said inner end of said torsion spring in a direction parallel to said longitudinal central axis of said torsion spring.

8. Apparatus as defined in claim 3 wherein said leaf spring is connected directly to said torsion spring.

9. Apparatus as defined in claim 8 wherein torsion spring has a circular cross-sectional shape centered on said longitudinal central axis of said torsion spring, said leaf spring extending tangent]ally from torsion spring.

10. Apparatus as defined in claim 3 wherein said torsion spring, said leaf spring and said supporting means are portions of a unitary body formed of a composite of plastic reinforced with glass fibers.

11. Apparatus as defined in claim 3 wherein said longitudinal central axis of said torsion spring intersects said hub axis and extends radially relative to said hub axis.

12. Apparatus as defined in claim 3 wherein said supporting means defines a hub having a cylindrical bearing surface centered on said hub axis, said torsion spring being spaced radially outward from said cylindrical bearing surface.

13. Apparatus as defined in claim 3 wherein torsion spring has opposite longitudinal ends, said leaf spring being connected to said torsion spring so as to twist one of said ends of said torsion spring relative to the other of said ends of said torsion spring when said leaf spring acts in series with said torsion spring.

14. Apparatus as defined in claim 3 further comprising means for defining a cam follower, said supporting means supporting said cam follower to rotate about said hub axis with said torsion spring and said leaf spring.

15. Apparatus as defined in claim 14 wherein said supporting means defines a hub having a cylindrical bearing surface centered on said hub axis, said supporting means including an actuator arm extending radially from said hub, said actuator arm supporting said cam follower at a location spaced radially from said hub.

16. Apparatus comprising:

means for defining a rotatable hub having a cylindrical bearing surface centered on a hub axis;

a plurality of arms extending radially from said hub, each of said arms being fixed to said hub so as to be rotatable about said hub axis with said hub, said arms including;

an actuator arm having means for imparting rotational movement to said hub upon application of a force to said actuator arm; and a spring arm having means for defining a torsion spring with a longitudinal central axis extending radially from said hub, said torsion spring being resiliently deflectable in torsion about said longitudinal central axis of said torsion spring;

a leaf spring having opposite longitudinal end portions, said leaf spring being resiliently bendable between said opposite longitudinal end portions; and means for connecting said leaf spring to said torsion spring for said leaf spring to act in series with said torsion spring and for said leaf spring to be rotatable about said hub axis with said spring arm.

17. Apparatus as defined in claim 16 wherein said means for imparting rotational movement to said hub includes a cam follower projecting from said actuator arm.

18. Apparatus as defined in claim 16 wherein said means for imparting rotational movement to said hub includes first and second side surfaces of said actuator arm, said first and second side surfaces respectively facing in first and second directions that are opposite to each other.

19. Apparatus as defined in claim 16 wherein said arms further include a detent arm having means for operatively engaging a spring-biased detent mechanism to limit rotation of said hub about said hub axis.

20. Apparatus as defined in claim 19 wherein said means for operatively engaging a spring-biased detent mechanism includes a pair of knobs on said detent arm.

21. Apparatus as defined in claim 16 wherein said arms further include an abutment arm having means for defining an abutment surface for limiting rotating of said hub about said hub axis upon movement of said abutment surface into contact with an obstacle located in the path of movement of said abutment arm about said hub axis.

* * * * *